Dec. 27, 1932. R. W. REGENSBURGER 1,892,539

METHOD AND MEANS FOR SEPARATING EGG WHITES

Filed Jan. 30, 1931

Richard William Regensburger
INVENTOR.

BY
ATTORNEY

WITNESS—

Patented Dec. 27, 1932

1,892,539

UNITED STATES PATENT OFFICE

RICHARD WILLIAM REGENSBURGER, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

METHOD AND MEANS FOR SEPARATING EGG WHITES

Application filed January 30, 1931. Serial No. 512,402.

My invention relates to methods and means for removing foreign material from egg whites. One object of the invention is to furnish an improved device for avoiding entry to the final container of foreign material such as egg shells or portions of yolk passing along with the egg albumen in the commercial separating of the whites from the yolks of the eggs.

Another object of my invention is to provide a method for handling separated egg whites which will practically assure the absence of such foreign material in the final product.

Figure 1:
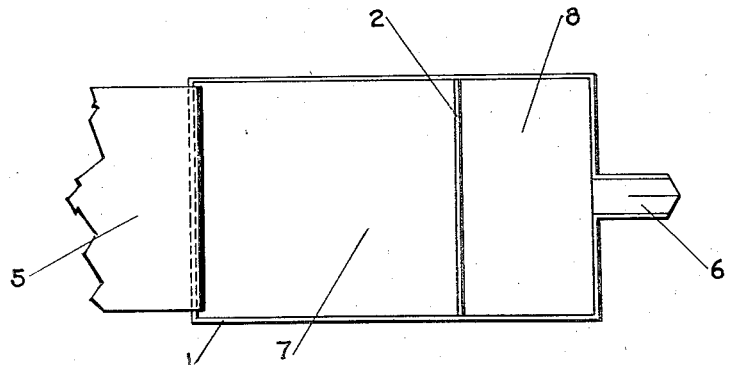
Figure 2:
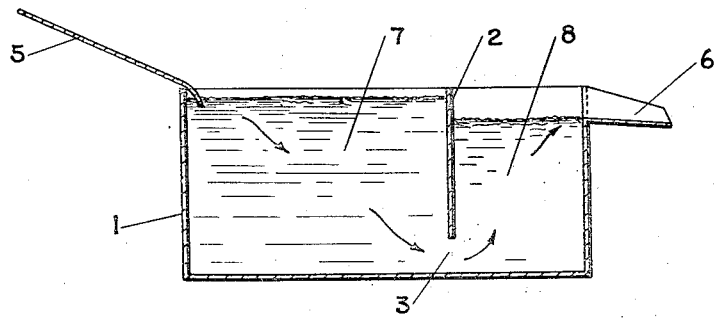
Figure 3:
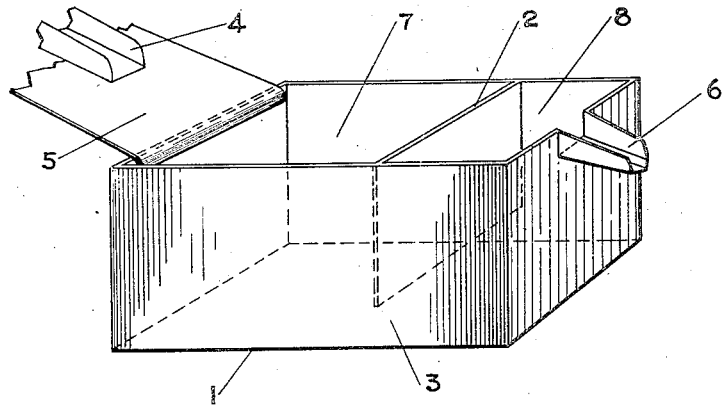

Other objects of my invention will be apparent from the description which follows:

The device is extremely simple in construction and operation, but efficient for the purpose intended. Referring now to the accompanying drawing which forms part of the specification:

In Figure 1, the plan view, Figure 2, a section, and Figure 3, a perspective, similar numbers of reference indicate identical parts in the several figures.

Receptacle (1) is provided with a baffle plate (2) which is preferably flush with the top of the receptacle but raised above the bottom to provide an opening (3) to permit under flow, but not over flow. Egg whites coming from the separator by a conveying means, as trough (4), drop on the shelf (5) and flow horizontally into receptacle (1), flow under the baffle plate (2) at (3), and out of receptacle (1) through the spillway (6).

The baffle plate (2) serves a dual purpose. In the first place, inasmuch as the direction of flow in the first compartment (7) is downward as well as forward, particles such as egg shells, having specific gravity greater than that of egg whites, settle to the bottom of the receptacle without danger of passing out of spillway (6). Although the direction of flow in the compartment (8) is upward as well as forward, it is not fast enough to carry egg shells to the top and over the spillway (6).

In the second place, it must be noted that egg yolks, having a higher fat content than the whites and consequently a lighter specific gravity, have a tendency to float on the top of the white. Inasmuch as the flow of the liquid in the receptacle is under the baffle, such egg yolks as may come over with the whites float and are trapped on top, making removal easy.

The long, gently sloping shelf (5) at the entry end of the trap, on which the incoming product drops, serves to avoid the mixing and emulsification of yolk which may be floating on the surface, and supports the egg whites during the travel between the separator and receptacle.

It is found in practice that if the incoming whites are allowed to drop on a portion of yolk floating on the surface, the effect of the drop will carry the yolk below the surface and emulsify it with the surrounding white. The yolk is then so intermingled with the white that it cannot free itself and rise to the surface again.

To avoid such conditions, the incoming product is discharged onto the shelf (5), from which it moves gently into the main liquid body in a horizontal direction without serious agitation or turbulence. The intermixing of whites and portions of yolk in the trap is consequently obviated.

In describing my invention, I have used egg shells as an example of material of greater specific gravity than egg whites, and egg yolks as an example of material of less specific gravity than egg whites.

It is to be understood, of course, that the principles involved apply to other materials as well. It will also be understood that changes may be made in the design of the device, as shown on the drawing, and in the manner of use of the device, without departing from the spirit of my invention as described in the following claims.

It will be noted that according to the invention as herein disclosed, there is provided in a two-compartment or two-section device —in which the two sections are in combination only at the lower portions thereof at 3—a main liquid body of egg white which is always maintained while the process of treating egg products in order to obtain pure, unadulterated egg white is being performed. In other words, the main liquid body is divided into two spaced sections—to wit, a large receiving section in compartment 7 and a small final or discharge section in compartment 8—that are in constant communication with each other along a lower communicating path 13 whereby egg white is always free to pass from or be supplied from the large receiving section to and into the small final delivery section. The height of the liquid in the final section is maintained up to an overflow or spillway 6 leading from the upper portion of the final section whereby there can be delivered from said overflow or spillway pure egg white as added egg white flows into the said final section from the larger receiving section. In the receiving section, the height of the liquid body therein is maintained at least as high or even slightly higher than that in the final section and so that upon the delivery of incoming egg products into the receiving section and consequent to the increased heat which tends to follow, there results a pressure equilibrium between the sections and a consequent flow or passing of a corresponding amount of egg white —an amount corresponding to the amount of egg white products thus delivered into the receiving section—from the receiving section into the passageway, from the passageway into the final receiving section and of purified egg white from the receiving section over the overflow or spillway leading from the upper portion of the receiving section.

I claim:

1. The procuring of egg white substantially pure, and free from air bubbles, emulsified yolk, and solid substances, by the method which consists in initially providing a main liquid body of egg white in two adjacent container sections which are in constant communication with each other at the lower portions thereof, which container sections are respectively referred to as the large receiving section and the small final discharge section, from which discharge section there is an overflow leading from the upper portion thereof, maintaining the liquid body which is in said final delivery section at a height up to the overflow, maintaining that portion of the liquid body which is in the receiving section always as high or even higher than the height of the liquid body in the final section, and delivering the incoming egg products to be purified along a gentle sloping path to and into the top of that portion of the main liquid body which is in the receiving section and in a manner to avoid turbulence or agitation and as a consequence of the delivery of the incoming egg products into the receiving section causing a flow of a corresponding amount of egg white from the receiving section into the communicating passageway and of a corresponding amount of egg white from the communicating passageway into the final discharge section and a consequent delivery of a corresponding amount of purified egg white from the receiving section out through the overflow thereof.

2. The production of egg white substantially unadulterated by air bubbles, emulsified yolk, and particles of egg shells, by the method which comprises the providing of a main liquid body of egg white which is divided into a large receiving section and a small final or delivery section independent of each other except that there is a flow path leading from the lower portion of the receiving section to the lower portion of the final or delivery section and in each of which sections the egg white liquid is maintained at least up to a predetermined height, the height in the delivery section always being maintained up to a place at and from which purified egg white is caused to pass from the delivery section, the height in the receiving section always being equal to or slightly greater than that in the final or delivery section, delivering egg products from which pure egg whites are to be derived along a gentle sloping path to and into that portion of the liquid body which is in the receiving section and in a manner to avoid turbulence and agitation in said section, and permitting a flow because of the delivering of the egg products into the receiving section of egg white from the lower portion of the receiving section through said flow path of communication into the lower portion of the final section and whereby purified egg products are made available for withdrawal from the upper portion of the final section when and as the height of the egg white in the final section extends the predetermined height.

Signed at Chicago, Illinois, this 27 day of January, A. D. 1931.

RICHARD WILLIAM REGENSBURGER.